United States Patent
Wethington et al.

(10) Patent No.: US 6,651,919 B2
(45) Date of Patent: Nov. 25, 2003

(54) FISHING LINE WINDER

(75) Inventors: G. Thomas Wethington, Jamestown, KY (US); Bill Mann, Louisville, KY (US); Craig Mueller, Louisville, KY (US); Steven M. Prentice, New Albany, IN (US); Wade L. Hehr, Fredericksburg, IN (US)

(73) Assignee: TBC Innovations, LLC, Jamestown, KY (US)

( * ) Notice: Subject to any disclaimer, the term of this patent is extended or adjusted under 35 U.S.C. 154(b) by 0 days.

(21) Appl. No.: 10/258,648

(22) PCT Filed: Apr. 26, 2001

(86) PCT No.: PCT/US01/40629
§ 371 (c)(1),
(2), (4) Date: Oct. 25, 2002

(87) PCT Pub. No.: WO01/81221
PCT Pub. Date: Nov. 1, 2001

(65) Prior Publication Data
US 2003/0132337 A1 Jul. 17, 2003

Related U.S. Application Data

(60) Provisional application No. 60/199,968, filed on Apr. 27, 2000.

(51) Int. Cl.$^7$ .......................... B65H 49/20; B65H 59/04
(52) U.S. Cl. .................. 242/423.2; 242/588.1; 242/599.2; 242/902

(58) Field of Search .................. 242/127, 129, 242/129.6, 129.62, 404.1, 405, 405.2, 405.3, 423.1, 423.2, 557, 588.1, 599.2, 902, 486.9, 487

(56) References Cited

U.S. PATENT DOCUMENTS

| | | | | | |
|---|---|---|---|---|---|
| 2,650,777 A | * | 9/1953 | Robbins | .................. | 242/423.2 |
| 2,747,812 A | * | 5/1956 | Lassen | .................. | 242/127 |
| 3,072,356 A | * | 1/1963 | Leuthner | .................. | 242/129.6 |
| 4,741,490 A | * | 5/1988 | Evans | .................. | 242/423.1 |
| 5,218,779 A | * | 6/1993 | Morgan et al. | .................. | 242/902 |
| 5,513,463 A | * | 5/1996 | Drinkwater | .................. | 242/902 |
| 6,224,011 B1 | * | 5/2001 | Gavaza | .................. | 242/902 |

* cited by examiner

Primary Examiner—John M. Jillions
(74) Attorney, Agent, or Firm—Middleton Reutlinger (57) ABSTRACT

A device for transferring fishing line between a supply spool (90) and a fishing reel (94) has a post (22) mounted between two rotatable footholds (30, 60) which are adapted to allow the user to hold the device between his feet as the line is fed from the spool to the reel. The post (22) is adapted to receive the fishing line supply spool, and to hold the spool (90) tightly on the post as line is pulled from the spool. The device of the present development is relatively small, can be used by one person unassisted, and does not require any particular mounting surface so it can be carried with the fisherman to any location where he is using his reel.

20 Claims, 8 Drawing Sheets

FISHING LINE WINDER

This application is a 371 of PCT/US01/40629, filed Apr. 26, 2001 which claims benefit of No. 60/199,968, filed Apr. 27, 2000

TECHNICAL FIELD

The present invention relates to a device for transferring fishing line between a supply spool and a fishing reel. The device allows the user to make this transfer unassisted by other persons.

BACKGROUND OF THE INVENTION

Fishing is a popular sport in this country. Typical fishing gear includes a rod and reel, fishing line, a hook, and a lure or bait. The fishing line is wound upon the reel, and the reel is mounted to the rod. The fishing line is fed from the reel to the end of the rod, and the hook is attached to the rod-end of the line. Additional line is fed from the reel when the hook is cast into the water. When a fish is caught a section of line may be cut off as the fish is removed from the rod, or sections of line may be cut off when the line becomes worn or frayed.

As the fishing line is removed from the rod, replacement line is fed from the reel. The reel must be refilled when essentially all the line on the reel is used, or when the fisherman desires a line having a different material composition, weight, or texture. The replacement fishing line is typically supplied on a spool, and a small portion of the line is transferred to the reel by unwinding the line from the spool and winding it upon the reel. When the line is wound upon the reel, it is necessary to ensure that there are no twists or knots in the line because knots prevent the line from feeding properly from the reel when the line is cast. Thus, it typically requires two people to replace the fishing line—one person to hold the spool and a second person to wind the line onto the fishing reel. This can be a problem if one is fishing alone and the need to replace the line arises.

Some devices have been designed that allow the fisherman to rewind the reel without having a second person available to help. For example, U.S. Pat. No. 5,551,645, issued to Torvund, describes a device that allows the user to transfer fishing line to a reel from a supply spool without the assistance of a second person. The supply spool is mounted on a support rod which is suspended between two moveable upright frames, and the fishing line is fed through an alignment bore in a bolt to align the line as it is pulled from the spool. A plurality of nuts are used to create tension on the spool so that the line is fed at the desired rate. While the device of the '645 patent allows a fisherman to wind the line onto a fishing reel without assistance, it requires that a flat surface be available to mount the device. Thus, it would be difficult for the fisherman to use the device of the '645 patent on a somewhat rugged shore. Motor-driven devices for transferring fishing line to a reel from a supply spool are described in U.S. Pat. No. 5,709,350, issued to Davis et al., and U.S. Pat. No. 5,906,329, issued to Wesley, Sr. Although the user can transfer the line without the assistance of a second person using these devices, the motors make the devices relatively heavy and it is not always possible to have a battery or electrical source available to drive the motors.

The present development relates to a device for transferring fishing line between a supply spool and a fishing reel. The device has a post mounted between two rotatable, semi-circular ends. The ends are adapted to allow the user to hold the device between his feet, ankles, or calves as the line is fed from the spool to the reel. The post is adapted to receive the fishing line supply spool, and to hold the spool tightly on the post as line is pulled from the spool. Relative to the prior art devices for rewinding fishing reels, the device of the present development is relatively small, can be used by one person unassisted, and does not require any particular mounting surface so it can be carried with the fisherman to any location where he is using his reel.

DETAILED DESCRIPTION OF THE PREFERRED EMBODIMENT

The fishing line winder depicted in the various Figures is selected solely for the purposes of illustrating the invention. Other and different fishing line winders may utilize the inventive features described herein as well.

Figure 1:
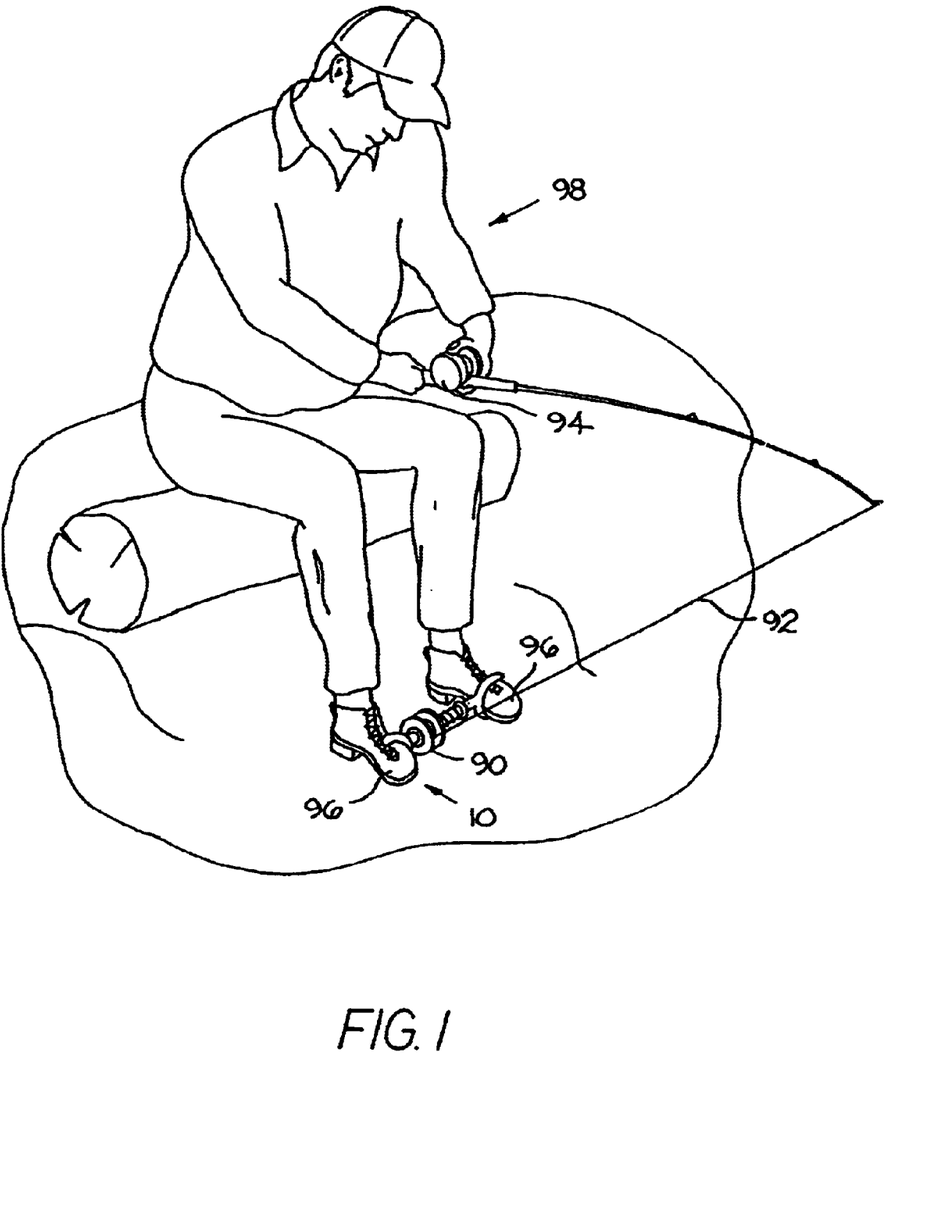
FIG. 1 is an illustration of a fisherman at a remote site using a fishing line winder made in accordance with the present invention.

FIG. 1 illustrates a fisherman 98 using a fishing line winder 10 made in accordance with the present invention at a remote site. A supply spool 90 of fishing line is mounted on the line wider 10. The fisherman holds the line winder 10 between his feet 96 (or he may hold it generally between his lower limbs, for example, between his ankles or calves), and pulls the line 92 toward the fishing reel 94. Because the fisherman 98 supports the line winder 10 between his feet 96, he can rewind his reel 94 without the assistance of a second person, and without needing a flat surface available to hold the line winder 10. Moreover, because the line winder 10 is relatively small, it can easily be carried by the fisherman 98 to any location where he is using his reel 94.

Figure 2:
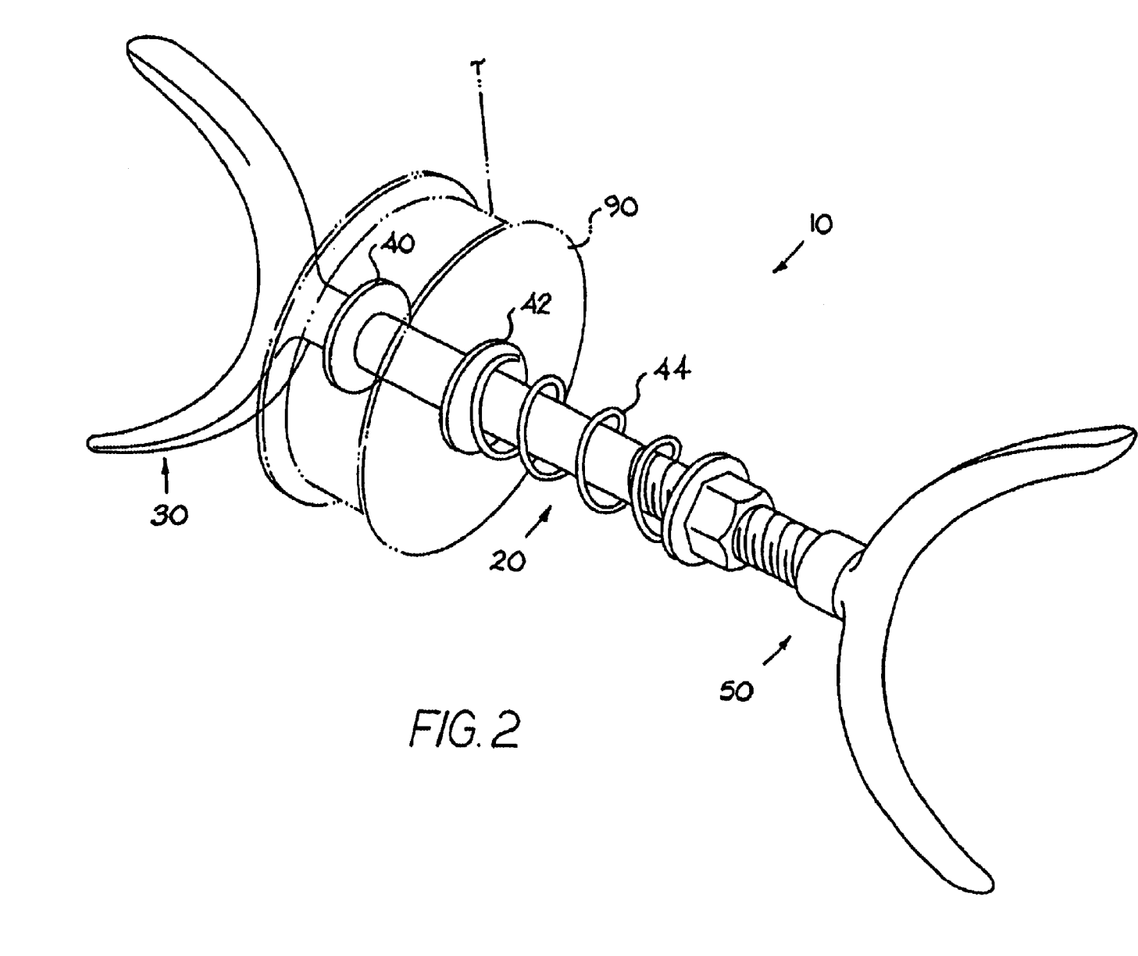
FIG. 2 is a perspective view of the fishing line winder of FIG. 1 with a supply spool shown in phantom.
Figure 3:
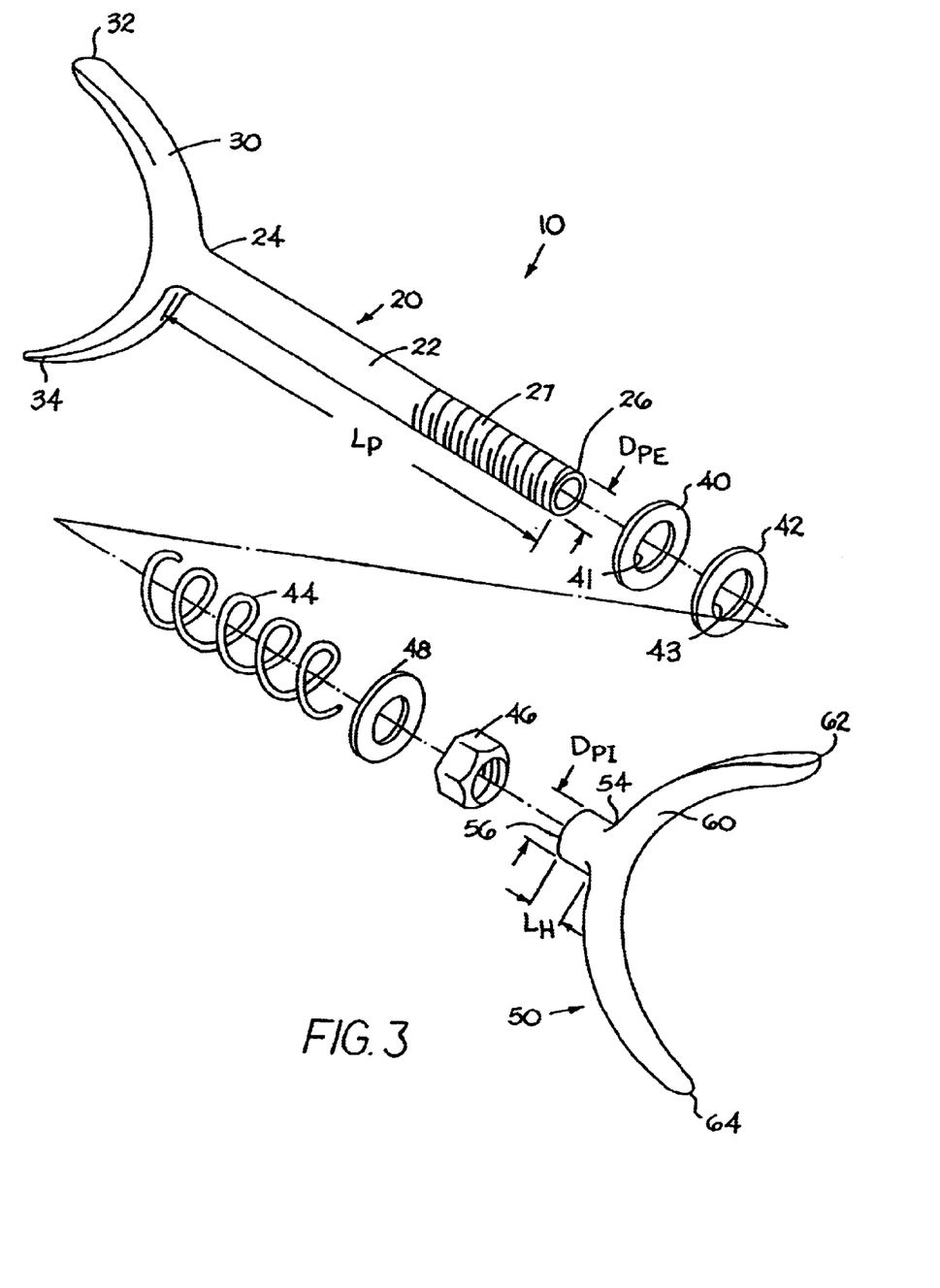
FIG. 3 is an exploded perspective view of the fishing line winder of FIG. 1.
Figure 4:
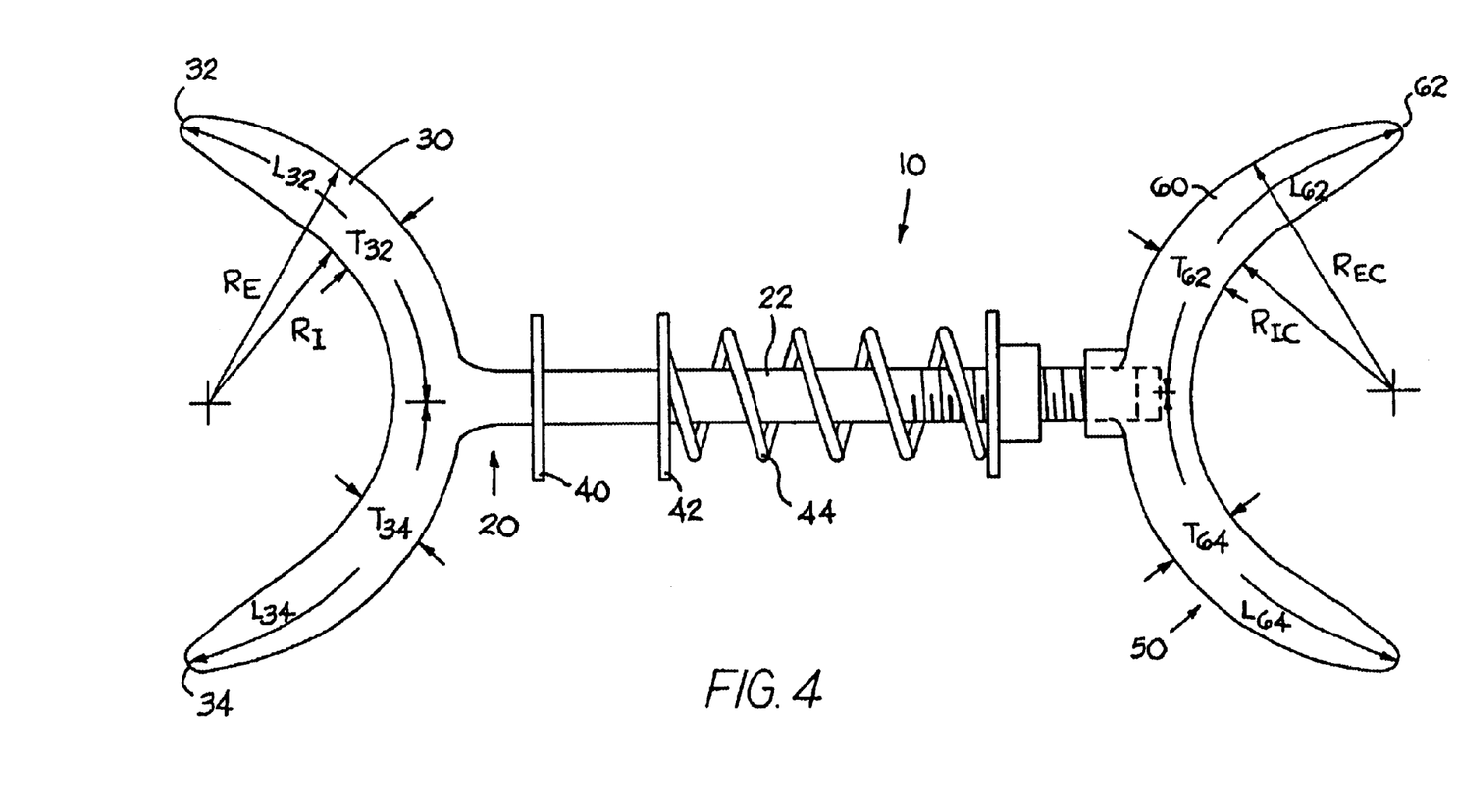
FIG. 4 is a side view of the fishing line winder of FIG. 1.

FIGS. 2–4 show the line winder 10 of FIG. 1 in greater detail. The line winder 10 has as major components a spool mounting piece 20; a connecting piece 50; two support plates 40, 42; and a spring 44.

The spool mounting piece 20 is adapted to hold a supply spool 90 of fishing line. The mounting piece 20 includes a post 22, having an external diameter "DPE" and a length "$L_P$", and defining a proximal end 24 and a distal end 26. At the proximal end 24, a foothold 30 is secured to the post 22. The shape of the foothold 30 may vary as desired by the user. For example, the foothold 30 may be semi-circular, U-shaped, C-shaped, arced, or any other shape which will fit around a user's lower limb, including the foot, ankle, or calf. In the present example, the foothold 30 has a semi-circular shape with an internal radius "$R_I$" and an external radius "$R_E$". The foothold 30 extends from the post 22 forming first and second branches 32, 34, with each branch 32, 34 having a length "$L_{32}$", "$L_{34}$", respectively, and a thickness "$T_{32}$", "$T_{34}$", respectively. The foothold 30 may be fixedly attached to the post 22, for example, the foothold 30 may be molded as a single unit with the post 22. Alternatively, the foothold 30 may be reversibly attached to the post 22, for example, the unit 30 and the proximal end 24 of the post 22 may have coordinating structure that allow the pieces to be tightly held together, such as matching screw-type threads or snap-together locking features. The foothold 30 is positioned relative to the post 22 such that the lengths "$L_{32}$", "$L_{34}$" of the two branches 32, 34 are essentially equal; although this is not required for the device to function as intended, and a user 98 may desire to have one branch significantly longer than the other for a more comfortable fit about the lower limb 96 when in use. In a preferred embodiment, the post 22 has an external diameter "DPE" of about ⅜ inch and a length "$L_P$" of about 5½ inches. The foothold 30 has a semi-circular shape with an internal radius "$R_I$" of about 1⅜ inches and an external radius "$R_E$" of about 1⅞ inches. The foothold 30 defines first and second branches 32, 34, and is fixedly attached to the proximal end 24 of the post 22. Each branch has a length "$L_{32}$", "$L_{34}$" of about 3 inches and a thickness "$T_{32}$", "$T_{34}$" of about one-half inch.

The distal end 26 of the post 22 is adapted to reversibly attach to the connecting piece 50 and to provide a means to retain the support plates 40, 42 and the spring 44 on the post 22. For example, in a preferred embodiment the end 26 has threads 27 which can mate with coordinating structure on the connecting piece 50. Alternative means for connecting the distal end 26 to the connecting piece 50 may include snap-together locking features, lock-and-key type locking devices, or similar reversible attachment means as are known in the art.

Mounted on the post 22 are first and second support plates 40, 42, and a spring 44. The support plates 40, 42 are relatively thin sheets of material of sufficient strength that the sheets will not bend when placed under pressure by the spring 44. The plates 40, 42 include apertures 41, 43, respectively, of sufficient diameter to allow the post 22 to protrude through the apertures 41, 43. For example, the plates 40, 42 may be metal washers, rigid plastic washers, galvanized rubber washers, or other similar rigid material having an aperture. The first support plate 40 is positioned near the proximal end 24 of the post 22. The first plate 40 may be fixedly attached to the post 22, or it may be allowed to slide on the post 22. The second support plate 42 is positioned between the first plate 40 and the distal end 26 of the post 22. The second plate 42 must be allowed to slide on the post so the user 98 can remove the second plate 42 and position the fishing line supply spool 90 on the post 22 between the first and second plates 40, 42. The spring 44 is positioned between the second plate 42 and the distal end 26, and is of sufficient length and tension that it can exert pressure against the second plate 42 when a fishing line supply spool 90 is mounted on the post 22. A tightening nut 46, which may include an optional washer 48, is threaded to mate with the threads 27, and holds the support plates 40, 42 and spring 44 on the post 22.

When a supply spool 90 is mounted on the post 22, the nut 46 can be tightened on the threads 27 to force the spring 44 to apply pressure on the second plate 42, which in turn applies pressure against the supply spool 90, forcing the spool 90 against the first plate 40. By keeping the spool 90 under pressure, the spool 90 will not rotate without the user 98 applying a positive force—such as, pulling on the fishing line 92 wound on the spool 90—so the spool 90 releases the line 92 at the rate desired by the user 98. If the spool 90 was allowed to freely rotate, the line 92 could become twisted or knotted as it is wound on the reel which would then cause problems when the line 92 is cast.

In a preferred embodiment, a fishing line winder having a post with an external diameter "$D_{PE}$" of about ⅜ inch and a length "$L_P$" of about 5½ inches, has first and second support plates 40, 42, each made of galvanized steel, and each being essentially circular washers with external diameters of about 1¼ inches and each having a centered aperture 41, 43 with a diameter of about one-half inch. The first support plate 40 is fixedly mounted to the post 22 via welding about 5 inches from the distal end 26 of the post 22. The second plate 42 is allowed to move on the post 22. A spring 44, approximately 2 inches in length with about 8 winds per inch, is mounted near the distal end 26 of the post 22, and a standard ⅜ inch nut 46 is threaded on the threads 27 to hold the second plate 42 and spring 44 on the post 22.

The connecting piece 50 includes a hollow post 52, having an internal diameter "$D_{PI}$" and a length "$L_H$", and defining a proximal end 54 and a distal end 56. At the proximal end 54, a foothold 60 is secured to the hollow post 52. The shape of the foothold 60 may vary as desired by the user. For example, the foothold 60 may be semicircular, U-shaped, C-shaped, arced, or any other shape which will fit around a user's lower limb, including the foot, ankle or calf. In the present example, the foothold 60 has a semi-circular shape with an internal radius "$R_{IC}$" and an external radius "$R_{EC}$". The foothold 60 extends from the post 52 forming first and second branches 62, 64, with each branch 62, 64 having a length "$L_{62}$", "$L_{64}$", respectively, and a thickness "$T_{62}$", "$T_{64}$", respectively. The foothold 60 is preferably fixedly attached to the post 52. The foothold 60 is positioned relative to the post 52 such that the lengths "$L_{62}$", "$L_{64}$" of the two branches 62, 64 are essentially equal, although this is not required for the device to function as intended, and a user 98 may desire to have one branch significantly longer than the other for a more comfortable fit about the lower limb 96 when in use. In a preferred embodiment, the post 52 has an internal diameter "$D_{PI}$" of about ⅜ inch and a length "$L_H$" of about one-half inch. The foothold 60 has a semi-circular shape with first and second branches 62, 64, and is fixedly attached to the proximal end 54 of the post 52. Each branch 62, 64 has a length "$L_{62}$", "$L_{64}$" of about 3 inches and a thickness "$T_{62}$", "$T_{64}$" of about one-half inch. The foothold 60 has an internal radius "$R_{IC}$" of about 1⅜ inches and an external radius "$R_{EC}$" of about 1⅞ inches.

Alternatively, the fishing line winder 10 may have only one support plate 42, and the tightening nut 46 may be excluded if the spring has sufficient length. For example, the line winder 10 may have one plate 42, which must be free to move along the post 22 between the proximal and distal ends, and the spring 44 mounted between the first foothold 30 and the plate 42. When fishing line is to be transferred, a supply spool 90 is mounted on the post 22 between the plate 42 and the distal end 26 of the post. The spool is retained on the post 22 by attaching the connecting piece SO to the post 22. The spring 44 applies pressure on the second plate 42, which in turn applies pressure against the supply spool 90, forcing the spool 90 against the second foothold 60. By keeping the spool 90 under pressure, the spool 90 will not rotate without the user 98 applying a positive force. The same result is achieved if the spool 90 is positioned on the proximal end 24 of the post 22, then the support plate 42 is positioned against the spool 90, then the spring 44 is positioned near the distal end 26 of the post 22, and the connecting piece 50 is attached to the post 22. Multiple spools of supply line can also be mounted on the post 22 by using additional support plates and springs to effectively isolate each spool 90. The fisherman can then select the line desired for transfer and pull that line to the reel in the same manner as with a single spool of line.

Figure 5:
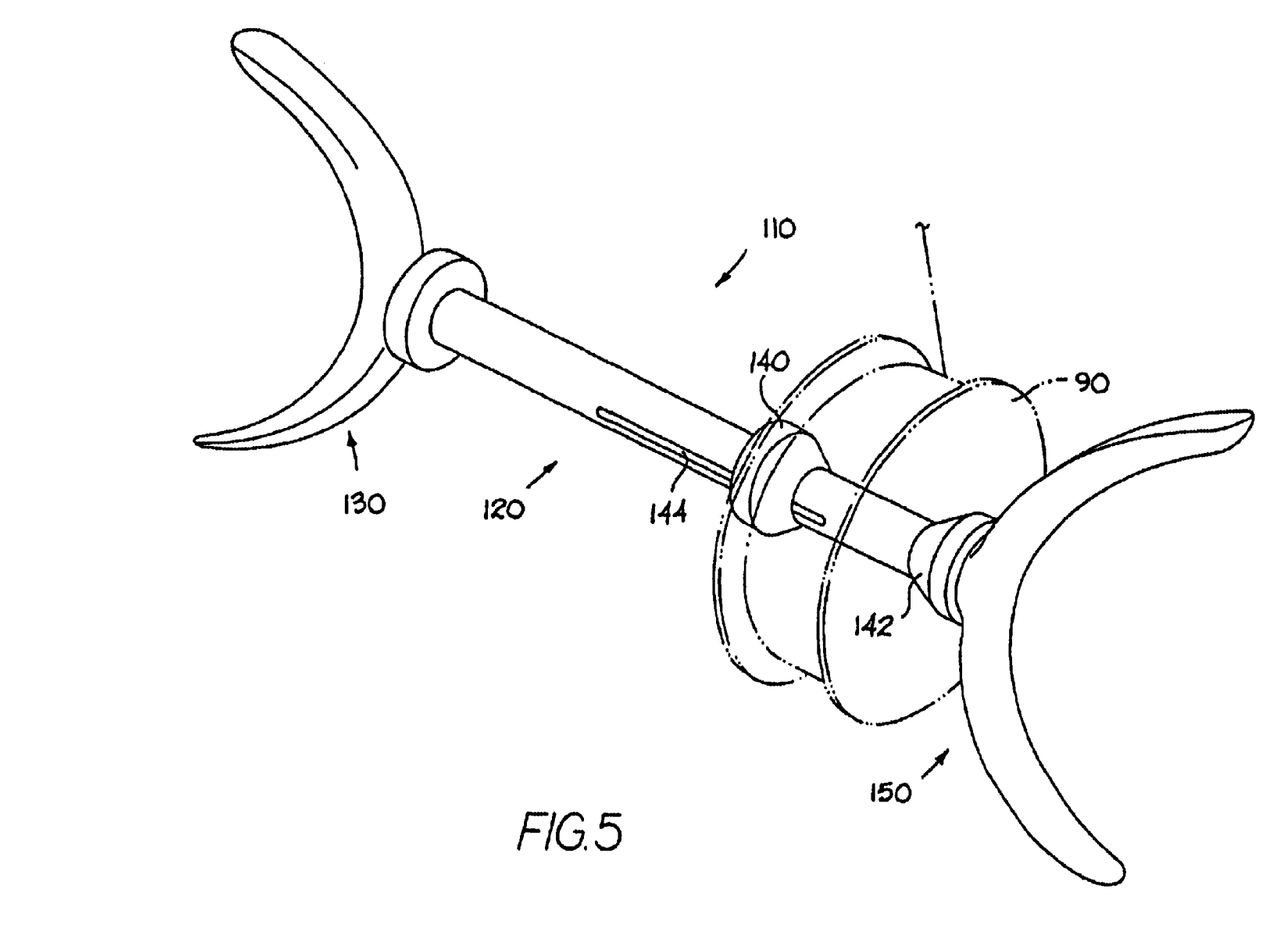
FIG. 5 is a perspective view of an alternative embodiment of a fishing line winder made in accordance with the present invention with a supply spool shown in phantom.
Figure 6:
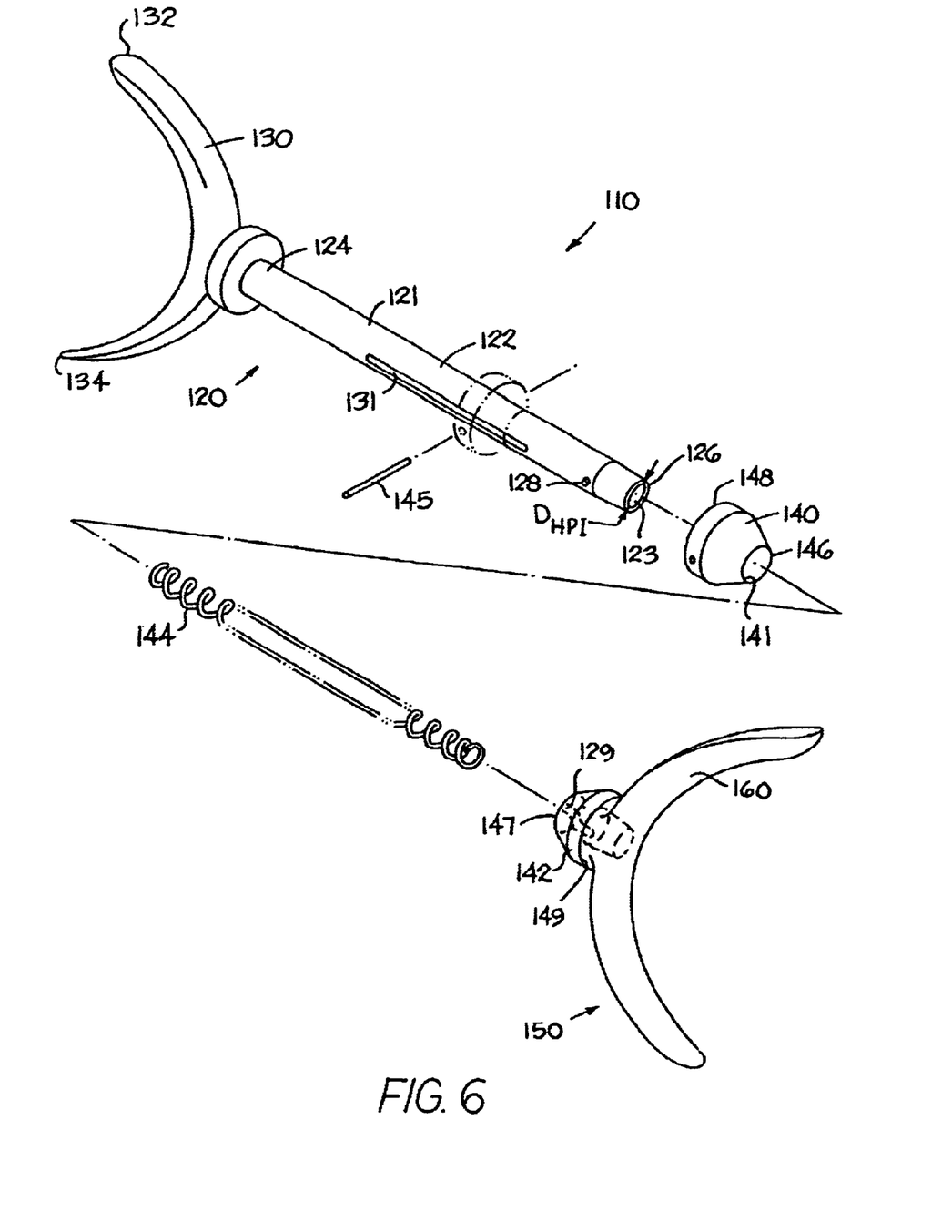
FIG. 6 is an exploded perspective view of the fishing line winder of FIG. 5.
Figure 7:
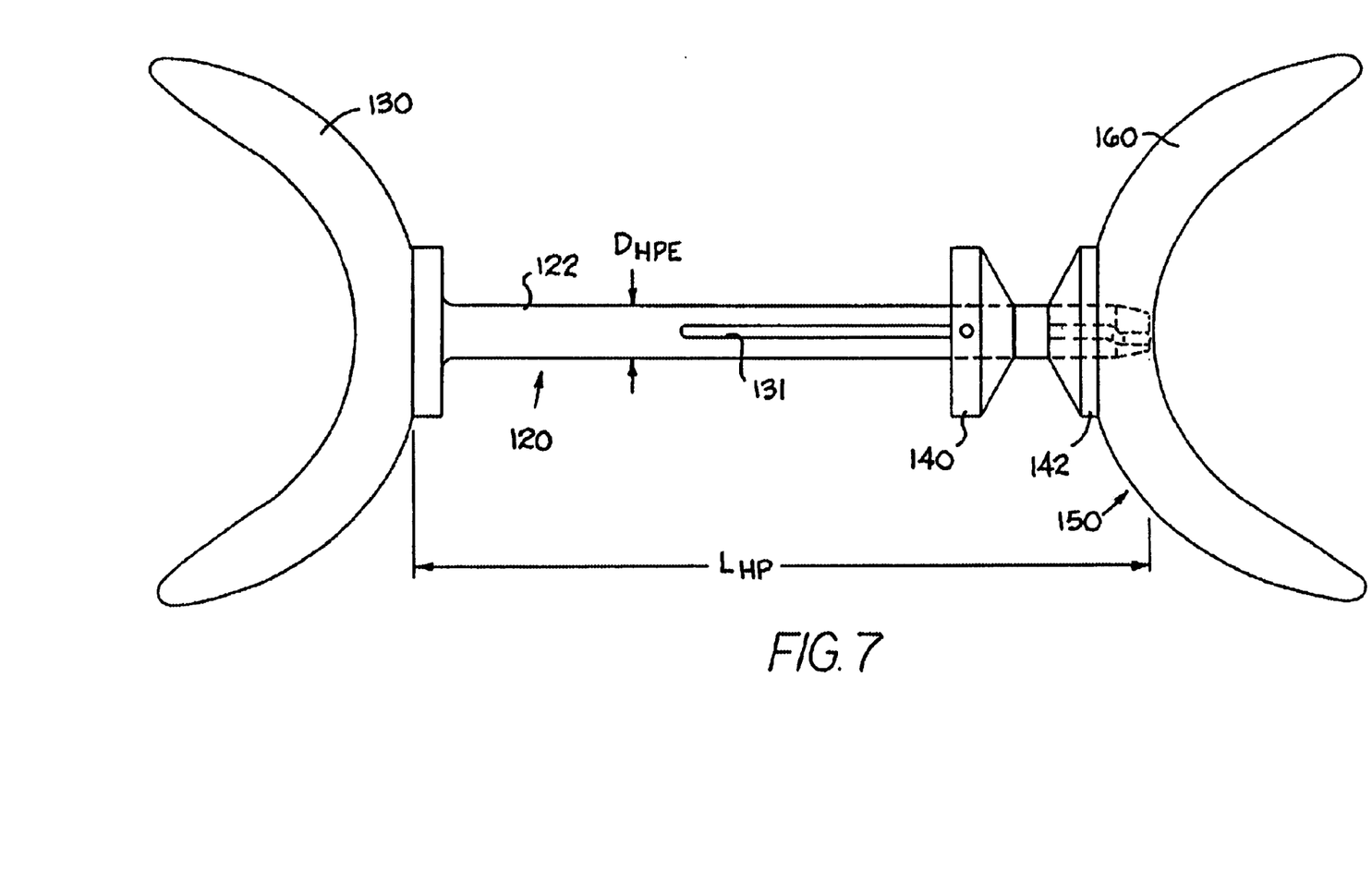
FIG. 7 is a side view of the fishing line winder of FIG. 5.

FIGS. 5–7 show an alternative embodiment 110 of a fishing line winder made in accordance with the present invention. Similar to the line winder 10 of FIG. 2, the line winder 110 has as major components a spool mounting piece 120; a connecting piece 150; two support plates 140, 142; and a spring 144. The spool mounting piece 120 is adapted to hold a spool 90 of fishing line. The mounting piece 120 includes a hollow post 122 and a foothold 130. The post 122 has an internal bore 123, a proximal end 124 and a distal end 126. The post 122 has an external diameter "$D_{HPE}$", an internal diameter "$D_{HPI}$", and a length "$L_{HP}$". A longitudinal "keyhole" or long, narrow aperture 131—running between the distal end 126 and the proximal end 124—is cut into the post 122. The foothold 130, which is essentially identical to the foothold 30 of FIG. 2, is secured to the proximal end 124 of the post 122. The foothold 130 may be fixedly attached to the post 122 or the foothold 130 and post 122 may have coordinating structure, such as mating threads or a lock-and-key, that allows the foothold 130 to be reversibly attached to the post 122. In the embodiment shown in FIGS. 5–7, the foothold 130 has two branches 132, 134, but the configuration of the foothold 130 and the branch lengths may vary as desired by the user. The distal end 126 of the post 122 is adapted to reversibly attach to the connecting piece 150, and may be threaded or may include snap-together locking features or similar reversible attachment means as are known in the art. In the embodiment shown, the post 122 attaches to the connecting piece 150 with a snap-together lock having a latch 128 on the post 122 which slides into and mates with a locking channel 129 on the connecting piece 150.

The first support plate 140 is mounted on the exterior surface 121 of the post 122. The first plate 140 may be a thin, metal material similar to the plate 40, or alternatively as shown in FIG. 6, the first plate 140 can have a frusto-conical shape, having a nose 146 and a tail 148. The advantage of using a plate with a frusto-conical shape as compared to a flat shape is that the nose 146 can project into the core of the fishing line supply spool 90 to hold the spool 90 steady as the fishing line 92 is withdrawn. This is particularly helpful if the core of the supply spool 90 is larger than the exterior diameter "$D_{HPE}$" of the post 122, thereby allowing the spool 90 to wobble on the post 122. The first plate 140 includes an essentially centered bore 141 of sufficient diameter to allow the post 122 to protrude through the bore 141, and at least one aperture 143 adapted to receive a holding pin 145. The pin 145 retains the plate 140 on the post 122 and is used to retract the spring 144, which is mounted within the bore 123 of the post 122. Specifically, the pin 145 is transverse to and protrudes through the aperture 143 of the first plate 140, and extends into the keyhole 131, lying between the spring 144 and the distal end of the post 122 or slightly within the distal end coils of the spring 144. When the plate 140 is forced toward the proximal end 124 of the post, the pin 145 also moves toward the proximal end 124 forcing the spring 144 to compress. When the spring 144 relaxes, the pin 145 is forced toward the distal end 126 of the post 122 carrying the plate 140 toward the distal end 126. If a spool 90 is positioned on the post 122, the plate 140 is pressed against the spool 90.

The second support plate 142 forms the "post" of the connecting piece 150. Similar to the first support plate 140, the second plate 142 preferably has a frusto-conical shape with a nose 147 and a tail 149. Fixedly attached to the tail 149 is a foothold 160, essentially identical to the foothold 60 of the line winder 10 of FIG. 2. In the embodiment shown in FIGS. 5–7, the foothold 130 has two branches 132, 134, but the configuration of the foothold 130 and the branch lengths may vary as desired by the user. The connecting piece 150 also includes coordinating structure for reversibly securing the connecting piece 150 to the spool mounting piece 120. In the embodiment shown in FIGS. 5–7, an internal channel 129 adapted to receive the latch 128 is bored through the second support plate 142 and the foothold 130.

Figure 8:
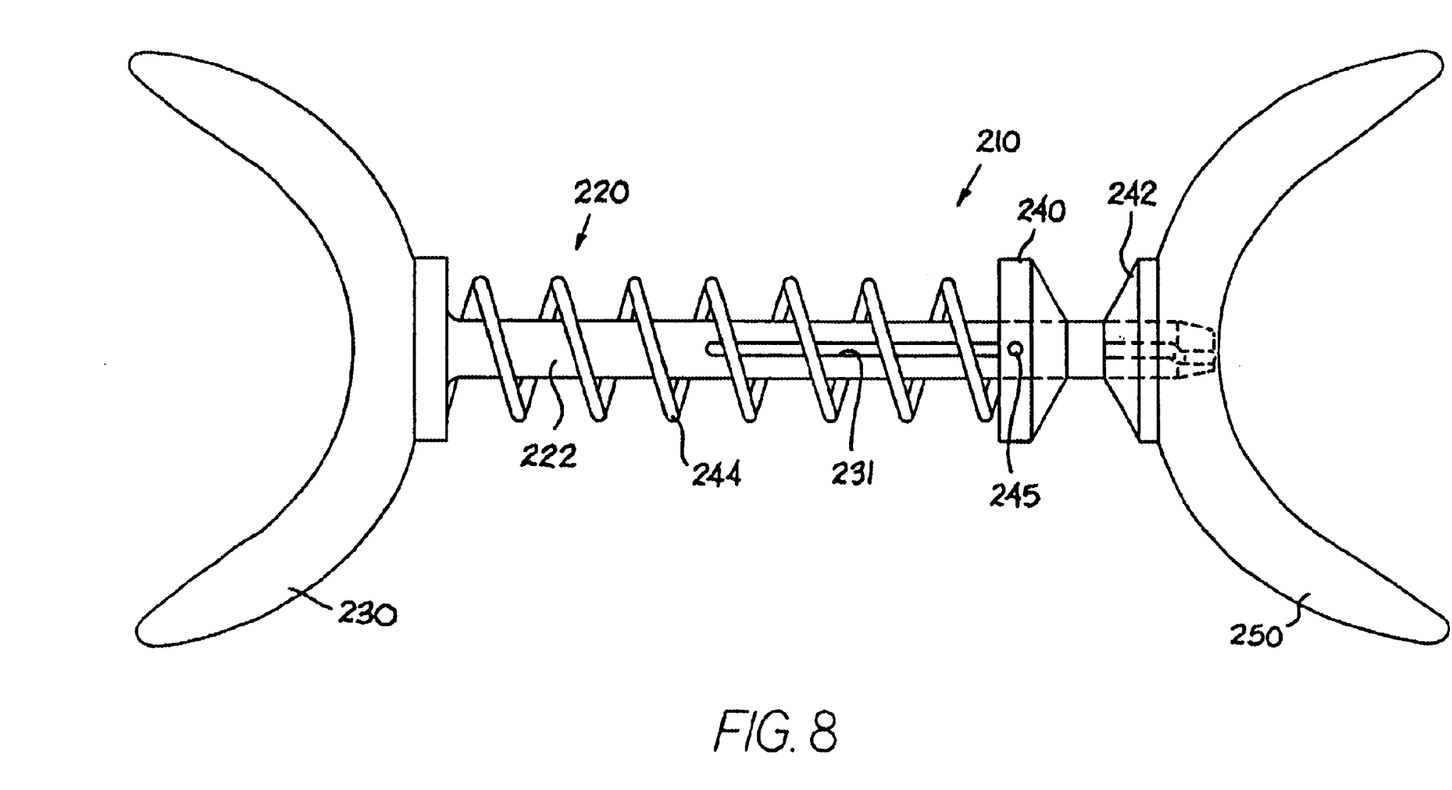
FIG. 8 is perspective view of a second alternative embodiment of a fishing line winder made in accordance with the present invention with a supply spool shown in phantom.

FIG. 8 shows a second alternative embodiment 210 of a fishing line winder made in accordance with the present invention. The line winder 210 has a first foothold 230, a connecting piece 250, and support plates 240, 242 which are essentially identical to the corresponding pieces 130, 150, 140, 142 of line winder 110. However, in the present embodiment 210, a spring 244 is mounted on the exterior face of the post 222 on the spool mounting piece 220. The spring 244 is positioned between the first foothold 230 and first support plate 240, and optionally may be attached to the first foothold 230, the first support plate 240, or both 230, 240. Because the spring 244 is mounted on the outside of the post 222, the post 222 can be either hollow like the line winder 210 of FIG. 5, or partially solid, or completely solid. If the post 222 is hollow or partially hollow, an optional pin 245 may project through the first support plate 240 and into a keyhole 231 in the post 222 to limit the forward movement of the first plate 240. If the post 222 is solid, the spring 244 is preferably attached to the first plate 240 limiting the forward motion of the plate 240 to the maximum relaxed extension of the spring 244.

The spool mounting pieces 20, 120, 220 connecting pieces 50, 150, 250 and support plates 40, 42, 140, 142, 240, 242 of the line winder 10, 110, 210 can be made from any relatively rigid, sturdy material, that has sufficient strength to allow the user to apply a gentle pressure on the footholds 30, 60, 130, 160, 230, 260 without causing any part of the line winder 10, 110, 210 to bend or flex. Some example materials include steel, reinforced aluminum, or a thermoplastic polymer, such as polyvinyl chloride (PVC), polyethylene terephthalate (PET), amorphous polyethylene terephthalate (APET), high density polyethylene/ethylvinyl acetate (HDPE/EVA) copolymer, glycol-modified polyethylene terephthalate (PETG), or a combination thereof.

From a reading of the above, one with ordinary skill in the art should be able to devise variations to the inventive features. For example, other support plates or spool holders could be employed with the instant invention; the plates may be selected to mate with the core of the supply spool; or, the spring may be secured to a foothold, or a support plate, or both. Further, alternative configurations of the footholds may be used. These and other variations are believed to fall within the spirit and scope of the attached claims.

What is claimed is:

1. A device for transferring fishing line between a supply spool and a fishing reel, said device comprising:
   a. a spool mounting piece, comprising:
      i) a post, having a proximal end and a distal end;
      ii) a first foothold, secured to the proximal end of said post and adapted to be held on a user's lower limb;
      iii) at least one support plate, mounted on said post such that said plate can move between the proximal and distal ends of said post; and
      iv) a spring, positioned between said first foothold and said support plate, said spring having sufficient length and tension to apply pressure against said plate; and, b. a connecting piece, comprising a post with a proximal end and a distal end, the distal end being adapted to mate with the distal end of said spool mounting piece post, and a second foothold secured to the proximal end of said connecting piece post and adapted to be held on a user's lower limb.

2. The line transfer device of claim 1 wherein said foothold extends from said post and forms first and second branches.

3. The line transfer device of claim 2 wherein said first and second branches each have a length, and the lengths are essentially the same.

4. The line transfer device of claim 2 wherein said first and second branches each have a length, and the length of said first branch is longer than the length of said second branch.

5. The line transfer device of claim 1 wherein said first foothold is fixedly attached to said post.

6. The line transfer device of claim 5 wherein said first foothold and said post form a single unit.

7. The line transfer device of claim 1 wherein said foothold is reversibly attached to said post.

8. The line transfer device of claim 7 wherein the proximal end of said post include threads and said foothold is adapted to receive said threads.

9. The line transfer device of claim 7 wherein the proximal end of said post includes a latch and said foothold is adapted to receive and retain said latch.

10. The line transfer device of claim 1 wherein said post includes a central bore, and said spring is mounted within said bore.

11. The line transfer device of claim 10 wherein said post further includes at least one slit extending through said post.

12. The line transfer device of claim 1 wherein said support plate is essentially flat.

13. The line transfer device of claim 1 wherein said support plate has a frusto-conical shape.

14. The line transfer device of claim 1 wherein said post of said connecting piece has a frusto-conical shape.

15. A device for transferring fishing line between a supply spool and a fishing reel, said device comprising:

a. a spool mounting piece, comprising:
      i) a post, having a proximal end and a distal end, said post having a central bore and at least one longitudinal slit through the post;
      ii) a spring, positioned within the bore of said post;
      iii) at least one support plate, mounted on said post such that said plate can move between the proximal and distal ends of said post;
      iv) a pin, transverse to and protruding through said plate, said pin extending into the bore of said post through the slit and positioned relative to said spring such that said pin lies between said spring and the distal end of said post; and
      v) a first foothold, secured to the proximal end of said post and adapted to be held on a user's lower limb; and,
   b. a connecting piece, comprising a post with a proximal end and a distal end, the distal end being adapted to mate with the distal end of said spool mounting piece post, and a second foothold secured to the proximal end of said connecting piece post and adapted to be held on a user's lower limb.

16. The line transfer device of claim 15 wherein said foothold extends from said post and forms first and second branches.

17. The line transfer device of claim 16 wherein said first and second branches each have a length, and the lengths are essentially the same.

18. The line transfer device of claim 15 wherein said support plate has a frusto-conical shape.

19. The line transfer device of claim 15 wherein said post of said connecting piece has a frusto-conical shape.

20. A method for transferring fishing line between a supply spool and a fishing reel, said method comprising mounting said spool between first and second support plates, projecting a post through said spool and said support plates, mounting a spring along said post to provide pressure against at least one of said plates, attaching footholds to the first and second ends of said post, and holding said footholds between a user's feet as fishing line is pulled from said spool toward said reel.

* * * * *